United States Patent
Barnes et al.

(10) Patent No.: US 9,477,847 B2
(45) Date of Patent: *Oct. 25, 2016

(54) METHOD AND SYSTEM FOR MANAGING PROCESSING RESOURCES

(71) Applicant: AMERICAN EXPRESS TRAVEL RELATED SERVICES COMPANY, INC., New York, NY (US)

(72) Inventors: Sharon Gail Barnes, Scottsdale, AZ (US); Kerry A. Marisa, New York, NY (US); Steven Wayne Mingl, Scottsdale, AZ (US); Kevin R. Murphy, Scottsdale, AZ (US); Harish R. Naik, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,152

(22) Filed: Oct. 30, 2015

(65) Prior Publication Data

US 2016/0055351 A1 Feb. 25, 2016

Related U.S. Application Data

(63) Continuation of application No. 13/649,366, filed on Oct. 11, 2012, now Pat. No. 9,207,982.

(51) Int. Cl.
*G06F 21/70* (2013.01)
*G06F 9/50* (2006.01)
*G06Q 10/10* (2012.01)
(Continued)

(52) U.S. Cl.
CPC .............. *G06F 21/70* (2013.01); *G06F 8/65* (2013.01); *G06F 9/50* (2013.01); *G06Q 10/10* (2013.01); *H04L 41/145* (2013.01)

(58) Field of Classification Search
CPC ............ G06F 8/65; G06F 9/50; G06F 21/70; G06Q 10/10; H04L 41/145
See application file for complete search history.

(56) References Cited

U.S. PATENT DOCUMENTS

| 7,483,774 B2 | 1/2009 | Grichnik et al. | |
|---|---|---|---|
| 8,606,894 B1 * | 12/2013 | Fremont | G06F 9/5061 709/223 |
| 8,799,431 B2 * | 8/2014 | Pabari | G06F 9/5072 709/220 |

(Continued)

OTHER PUBLICATIONS

USPTO, Office Action dated Jan. 22, 2015 in U.S. Appl. No. 13/649,366.

(Continued)

*Primary Examiner* — Tonia L Dollinger
*Assistant Examiner* — Dixon Dabipi
(74) *Attorney, Agent, or Firm* — Snell & Wilmer L.L.P.

(57) ABSTRACT

The present disclosure improves upon existing systems and methods by providing a tool for managing processing resources. For instance, the presently described tool may be used to time replacement, plan for uplifts, budget for uplifts/decommissioning of hardware, and/or maintain a plurality of servers. This tool may lead to increased satisfaction, uptime, and a reduction of unexpected costs. The system may include initiating collection of variables to compile a prioritized list of servers, executing, a calculation application for determining a prioritized list of servers' end of life targets based on both technical and business parameters based on the entered variables, and prioritizing uplifts of the servers based on the technical and the business parameters.

20 Claims, 5 Drawing Sheets

US 9,477,847 B2

Page 2

(51) Int. Cl.
*G06F 9/445* (2006.01)
*H04L 12/24* (2006.01)

(56) References Cited

U.S. PATENT DOCUMENTS

| | | |
|---|---|---|
| 2002/0002421 A1 | 1/2002 | Murofushi |
| 2002/0174384 A1* | 11/2002 | Graichen .............. G06F 11/008 |
| | | 714/37 |
| 2006/0282362 A1 | 12/2006 | Nasr et al. |
| 2007/0136788 A1 | 6/2007 | Monahan et al. |
| 2007/0282985 A1* | 12/2007 | Childress .............. G06F 9/5061 |
| | | 709/223 |
| 2009/0024425 A1* | 1/2009 | Calvert ................. G06Q 10/06 |
| | | 705/7.25 |
| 2010/0319060 A1 | 12/2010 | Aiken et al. |
| 2011/0173626 A1* | 7/2011 | Chi ....................... G06F 9/5072 |
| | | 718/103 |
| 2012/0166249 A1 | 6/2012 | Jackson |
| 2013/0339776 A1* | 12/2013 | Jagadishprasad ..... G06F 9/5094 |
| | | 713/340 |

OTHER PUBLICATIONS

USPTO, Final Office Action dated Jul. 21, 2015 in U.S. Appl. No. 13/649,366.
USPTO, Advisory Action dated Sep. 29, 2015 in U.S. Appl. No. 13/649,366.
USPTO, Notice of Allowance dated Oct. 7, 2015 in U.S. Appl. No. 13/649,366.

* cited by examiner

METHOD AND SYSTEM FOR MANAGING PROCESSING RESOURCES

CROSS-REFERENCE TO RELATED APPLICATION

This application is a continuation of, claims priority to and the benefit of, U.S. Ser. No. 13/649,366 filed Oct. 11, 2012 entitled "METHOD AND SYSTEM FOR MANAGING PROCESSING RESOURCES," which is incorporated herein in its entirety by reference.

FIELD

The present disclosure generally relates to resource management. More particularly, the disclosure relates to methods, systems, and computer readable medium for managing processing resources.

BACKGROUND ART

An organization may use servers to host applications and provide one or more services. For the organization to operate normally, it is important to keep the servers in a functional state. At times, a server may stop functioning due to various reasons, such as, failure in server hardware, server software, applications and/or services hosted by the server, and/or combination thereof. In some cases, the failure of a server is abrupt and is not foreseen. For example, an unexpected crash of an operating system of a server may cause an abrupt failure. In other cases, the failures in the server may be more predictable. For example, risk of hardware failure increases as the hardware ages. The abrupt or predictable failures of the one or more servers may disrupt the normal functioning of the organization. Such disruptions are not desirable from the organization's perspective. The disruptions may cause loss of data, loss of man hours, and/or loss in revenue, etc. Also, the disruptions may cause inconvenience to merchants and/or customers of the organization. This may lead to loss of confidence of the customers and/or the merchants in the organization.

SUMMARY OF THE DISCLOSURE

The above needs are successfully met via the disclosed system and method. Moreover, the present disclosure improves upon existing systems and methods by providing a tool for managing processing resources. For instance, the presently described tool may be used to time replacement, plan for uplifts, budget for uplifts/decommissioning of hardware, and/or maintain a plurality of servers. This tool may lead to increased satisfaction, uptime, and a reduction of unexpected costs.

In accordance with various embodiments, the system comprises accessing variables, wherein the variables facilitate compiling a prioritized list of servers, executing, a calculation application for determining a prioritized list of servers' end of life targets based on both technical and business parameters via the entered variables, and prioritizing uplifts of the servers based on the technical and the business parameters. In some embodiments, a server may be removed from the prioritized list of servers based on an indicator signifying the server is previously designated to be uplifted. For instance, in the case where there is an indication that a business unit is planning on paying for the uplift (such as out of turn) and/or the uplift was needed due to an unforeseen need.

The variables discussed above may include the install date, the operating system of an application being processed by each server, a Sarbanes-Oxley score designated to an application processed by the server, and a data security score attributed to an application processed by the server. The business parameters may comprise an application criticality score which may be based on a combination of a Sarbanes Oxley score and a data security score of the applications processed by the server. For instance, the Sarbanes Oxley score may be based on a Sarbanes Oxley code designated to and associated with each application processed by the server based on the application's association with the Sarbanes Oxley Act of 2002.

The computer based system may budget uplifts in advance based on a priority. The server's end of life target may be based on a matrix. Within this matrix, the operating system platform of the server and/or applications running on the server may be compared with an application criticality of application processed by the server. The server's end of life calculated target date may include a designated year for uplifting as calculated from the installation date of the server.

In various embodiments, the technical and the business parameters may comprise server characteristics, uptime reliability score, flexibility, and a maintenance cost score. In various embodiments, the server characteristics comprise a virtual or physical server designation. In various embodiments, the uptime reliability score is based on at least one of the age of the server, the server utilization, the application criticality, the age of manufacturer' hardware model, the hardware warranty status, and availability of operating system support.

Also, in various embodiments, the flexibility is based on at least one of the age of the manufacturer's hardware model and an alignment with current hardware standards of an organization running applications on the server. In various embodiments, the maintenance cost score is based on at least one of the alignment with current hardware standards of an organization running applications on the server, designation of orphaned servers and/or the power consumption of the server. The computer based system may specify servers with a history of faults ahead of/as a higher priority than older servers on an individual basis.

In various embodiments the data security score is based on an assigned scaled weight of security used by each application running on each server. This weight may be calculated and/or assigned during an audit. In various embodiments the data security score is based on at least one of a public, business confidential, restricted or secret designation of an application processed by the server. The prioritization may be updated/re-prioritized based on the start of a new budget term.

Further features and advantages of the present disclosure as well as the structure and operation of various embodiments are described in detail below with reference to the accompanying drawings.

BRIEF DESCRIPTION OF THE DRAWINGS

The features and advantages of the present disclosure will become more apparent from the detailed description set forth below when taken in conjunction with the drawings, in which like reference numbers indicate identical or functionally similar elements. Additionally, the left-most digit of a reference number identifies the drawing in which the reference number first appears.

DETAILED DESCRIPTION

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 1:
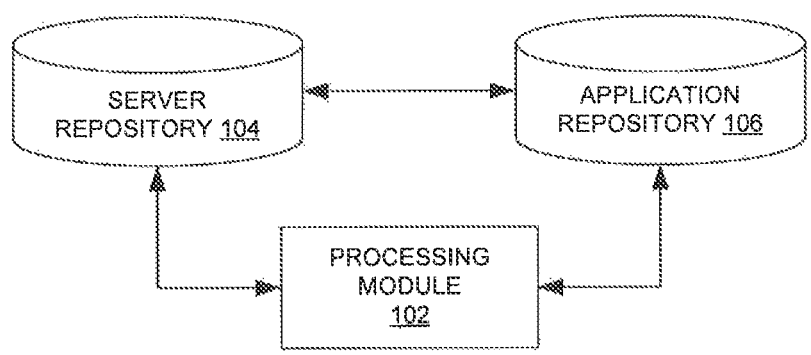
FIG. 1 is an overview of an example computer-based system for managing processing resources, according to various embodiments of the present disclosure.

FIG. 1 is an overview of an example system 100 for managing processing resources, in accordance with various embodiments of the present disclosure. System 100 determines end of life (EOL) for resources. System 100 also provides data associated with the health of the resources that can be used in planning for replacement of the resource, uplifts of a resource, budget for uplifts/decommissioning of hardware, and/or maintenance of plurality of resources. The resources as described herein may refer to a plurality of servers of an organization. In an example implementation, system 100 includes a processing module 102, a server repository 104 and an application repository 106.

Processing module 102 may access a variable from server repository 104 and/or application repository 106. Processing module 102 may compile a prioritized list of servers among the plurality of servers by processing the variable. The variable may include a server install date, an operating system of an application being processed by each server of the plurality of servers, a Sarbanes-Oxley score designated to an application processed by each server of the plurality of servers, and a data security score attributed to an application processed by each server, among others. In an example, the prioritized list of servers may refer to servers that may have reached end of a useful service life and/or are likely to have hardware and/or software problems in the near future. For instance, the hardware problems may be due to ageing of the components. The software problems may be due to change in standards of the software, lack of support from product provider, and/or the like. The prioritized list of servers may have to be uplifted based on a priority, to plan for/avoid any potential impact on applications and/or services hosted therein. The term 'uplift' may refer to replacement, refresh, modification, upgrade or update in hardware and/or software of the server, or any combination thereof. The applications may include any application. For example, the applications may include accounting applications, office applications, platform specific applications, middleware, infrastructure applications, and the like, that support business operations of the organization. The services may include applications that support customers/merchants of the organization such as, online account services, trading services, and/or the like.

Processing module 102 determines end of life (EOL) targets for the plurality of servers based on a first set of technical and/or business parameters of the applications running on each server of the plurality of servers. The first set of technical and business parameters of the applications are based on the variables. The first set of technical parameters may include a server install date and an operating system of an application being processed by each server of the plurality of servers. The first set of business parameters may include an application criticality score assigned to an application and may be based on a combination of a Sarbanes Oxley score and a data security score of the application processed by each server. The server install date as discussed herein refers to a date of installation of a server. The operating system of an application may refer to the operating system on which the application is being processed by a server. The Sarbanes Oxley (SOX) score may refer to a value based on a Sarbanes Oxley code designated to each application processed by each server based on the application's association with/relevance to the Sarbanes Oxley Act of 2002. Processing module 102 may access SOX scores for each of the applications from application repository 106. The SOX scores may be based on the application being active, inactive or not being SOX critical. The data security score may indicate a weight of the security of an application for the organization and/or customer. The data security score may be based on an assigned scaled weight of security needed for each application running on each server of the plurality of servers. The applications may be designated as one of public, business confidential, restricted or secret, based on a scaled weight of the security needed. Each of the applications may be assigned with the data security score based on the designation. For example, applications having secret data, such as, trade secrets, may be assigned with maximum security weight and correspondingly, a maximum data security score may be assigned. In another example, applications having basic public data may have security weigh which is less than the applications having secret data and correspondingly, the data security score for the applications having public data would be less compared to the data security score of the secret data.

Processing module 102 may provide a weight to the SOX score and the data security score. Processing module 102 may also obtain the weight from server repository 104. For instance, application details may be stored by the Application Repository. These application details may include an indicator provided based on an assessment to designate if the application is a SOX critical application or not. The application may also be designated with an indicator designating if the application is active or inactive. For example, according to various embodiments, there may be 3 distinct status' assigned, 1) Active (SOX critical app), 2) Inactive or 3) Never been SOX critical. A high weightage may be assigned to a SOX critical application (e.g. a score of 100) and a low weightage may be assigned non critical applications (e.g. a score of 0). These scores in combination may then be used to calculate overall SOX score of the server.

According to various embodiments, these application details may include an indicator provided based on an assessment to designate the data security of each application. For example, an indication that the application contains or processes data that is classified as Public, Confidential, Restricted or Secret in nature. This may be based on a standard, such as transaction account issuer Information Security Standard. According to an embodiment, based on the information, a score may be assigned to each application. For example, secret may have the highest score and it would be considered as more critical than an application processing data with a Public category designation. These scores in combination may then be used to calculate overall data security score of the server.

Stated another way, based on the weights, processing module 102 may determine the application criticality score for each application processed by each server. The application criticality score may indicate the importance of the application for the organization, the customer and/or the merchant. Based on the application criticality score, processing module 102 may determine the application criticality. For example, processing module 102 may determine that an application criticality is high, if the application criticality score is more than a pre-defined threshold score. Otherwise, processing module 102 may determine that the application criticality is low. Based on the application criticality and the operating system of an application being processed by a server, processing module 102 may determine the EOL targets for each of the plurality of servers using a matrix. The matrix may include values that correspond to the application criticality and the operating system platform of the application. Within the matrix, processing module 102 may compare the operating system platform of the application processed by the server with the application criticality of application processed by the server. Based on the values in the matrix, processing module 102 determine the EOL targets for each of the plurality of servers. The EOL target for each server may include a designated year for uplifting the server as calculated from the installation date of the server.

Processing module 102 prioritizes uplifts of each of the plurality of servers to create a priority. The priority indicates list of servers that may require replacements and/or uplifts in hardware and/or software on a priority basis to avoid any impact on the applications and/or the services. The priority may indicate an order in which servers that may require uplifts. Processing module 102 may prioritize uplifts based on a second set of technical and business parameters. The second set of technical and business parameters may include server characteristics, uptime reliability score, flexibility, a maintenance cost score, and/or the like. The server characteristics may include a virtual or physical server designation. The servers may be implemented as a 'V parent', a physical server, a virtual server, a 'VSS', and/or the like. The 'V parent' and the physical server may be designated as a physical server. The virtual server and the VSS may be designated as a virtual server. Processing module 102 may obtain the server characteristics from server repository 104. The uptime reliability score may indicate the reliability of the server. Processing module 102 may generate the uptime reliability score based on one or more of the age of each server, each server's utilization, an application being processed by each server's criticality, age of manufacturer' hardware model for each server, hardware warranty status for each server, availability of operating system support for each server, and/or the like. According to various embodiments, processing module 102 may obtain the uptime reliability score from server repository 104.

The parameter 'flexibility' may indicate the age of hardware model of the server and ease of alignment of the server with current hardware standards. Processing module 102 may calculate the flexibility parameter based on one or more of the age of the manufacturers hardware model and/or ease of the server alignment with current hardware standards of an organization running applications on each server. In another example, processing module 102 may obtain the flexibility parameter from server repository 104. The maintenance cost score for a server may indicate the cost of maintaining the server. Processing module 102 may generate the maintenance cost score based on one or more of capability of aligning the server with current hardware standards of an organization running applications on each server, designation of orphaned servers, power consumption of each server, etc.

Processing module 102, upon determining EOL targets for each of the plurality of servers and/or creating the priority, may budget the uplifts based on the priority. Processing module 102 may mark one or more of the plurality of servers for uplift based on the priority. Processing module 102 may determine EOL targets for each server of the organization and/or create the priority at periodical intervals, for example, at the start of each budget year, at the beginning of each quarter, every semester, at other predetermined intervals, etc. Processing module 102 may also perform these tasks in response to a request, for example, as a part of an audit process within the organization at any time. The priority may be updated based on this audit. With the EOL targets and priority list, resource staff may be equipped with data for budgeting for server uplifts and changes in architecture. Processing module 102 may remove a server in the list of prioritized set of servers based on an indicator signifying the server is previously designated to be uplifted. For example, one or more servers that have history of faults may be marked with an indicator for uplifting even before creating the priority. In another example, one or more servers that may have failed abruptly due to various reasons such as hardware failure, virus attacks, and/or the like may be marked with an indicator for uplifting. Processing module 102 may obtain the indicator from server repository 104 and/or application repository 106.

In various embodiments, processing module 102 as described herein may be a computer-based system such as, for example, a server, any suitable personal computer, a mobile device, a personal data assistant (PDA), a network computer, a workstation, a minicomputer, a mainframe or the like. In various embodiments, processing module 102 may be a component that can be implemented in the computer-based systems. Processing module 102 may also be an independent component made of hardware, software, or hardware and software that can be implemented in or in conjunction with the computer-based systems. Those skilled in art can appreciate that computer-based system includes an operating system (e.g., Windows NT, 95/98/2000, OS2, UNIX, Linux, Solaris, MacOS, etc.) as well as various conventional support software and drivers typically associated with server/computer. Processing module 102 as described herein may be deployed by the organization and/or or a third-party associated with the organization.

In various embodiments, processing module 102 may be implemented as a set of computer related instructions. Processing module 102 may be configured to execute a set of computer related instructions.

Server repository 104 may include information about the plurality of servers of the organization. The information may include installation dates of server, the operating systems run by each of the plurality of servers, the applications run by each of the of the plurality of servers, the operating system on which the applications are run, the server characteristics of each of the plurality of servers, age of servers of each of the plurality of servers, utilization data of each of the plurality of servers, application criticality data run by each of the plurality of servers, age of manufacturers hardware model for each of the plurality of servers, hardware warranty data of each of the plurality of servers, data indicating whether manufacturer of the operating system is providing the support for each of the operating systems run on each of the plurality of servers, data indicating how much the server hardware is aligned with the current hardware standards, applications being terminated, data associated with orphaned servers, power consumed by each of the plurality of servers, data indicating whether the server, operating system and/or applications are marked for decommission or uplift, and the like.

Application repository 106 may include information about the applications of the organization, types of the applications, the applications run on each of the plurality of servers, the applications run on each of the plurality of servers, the applications run on the operating systems of plurality of servers, Sarbanes-Oxley data for each of the applications, data security weight for each of the applications, and the like.

Server repository 104 and/or application repository 106 may include data about the organization infrastructure related programs. The data related to the organization infrastructure related programs may include information about changes in server infrastructure, plans for modification of the organization infrastructure such as, server being marked for uplift decommissioning, application rationalization, application decommissioning, and/or application infrastructure uplift for all the applications on the server. Although, FIG. 1 illustrates server repository 104 and application repository 106 as separate repositories, server repository 104 and application repository 106 can be implemented as one repository or multiple repositories.

Server repository 104, application repository 106 may comprise date which may be retrieved by the system to calculate a prioritized list, such as a list of server uplifts. Server repository 104, application repository 106 and/or one or more databases associated with system 100 may employ any type of database, such as relational, hierarchical, graphical, object-oriented, and/or other database configurations. The databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. In accordance with one aspect of the system, any suitable data storage technique may be utilized to store data without a standard format. In one exemplary embodiment, the ability to store a wide variety of information in different formats is facilitated by storing the information as a BLOB. The BLOB method may store data sets as ungrouped data elements formatted as a block of binary via a fixed memory offset using one of fixed storage allocation, circular queue techniques, or best practices with respect to memory management (e.g., paged memory, least recently used, etc.). As stated above, server repository 104, application repository 106, and/or other databases store data without regard to a common format. However, in one exemplary implementation of the system, the data set (e.g., BLOB) may be annotated in a standard manner. The annotation may comprise a short header, trailer, or other appropriate indicator related to each data set that is configured to convey information useful in managing the various data sets.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, consumer, customer or the like. Furthermore, the security information may restrict/permit only certain actions such as accessing, modifying, and/or deleting data. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

Server repository 104, application repository 106, and/or other databases described herein contemplate a data storage arrangement wherein the header or trailer, or header or trailer history, of the data is stored on the transaction instrument in relation to the appropriate data. One skilled in the art will also appreciate that, for security reasons, any databases, systems, devices, servers or other components of server repository 104, application repository 106, and/or other databases described herein may consist of any combination thereof at a single location or at multiple locations, wherein each database or system includes any of various suitable security features, such as firewalls, access codes, encryption, decryption, compression, decompression, and/or the like.

The software elements disclosed herein may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Figure 2:
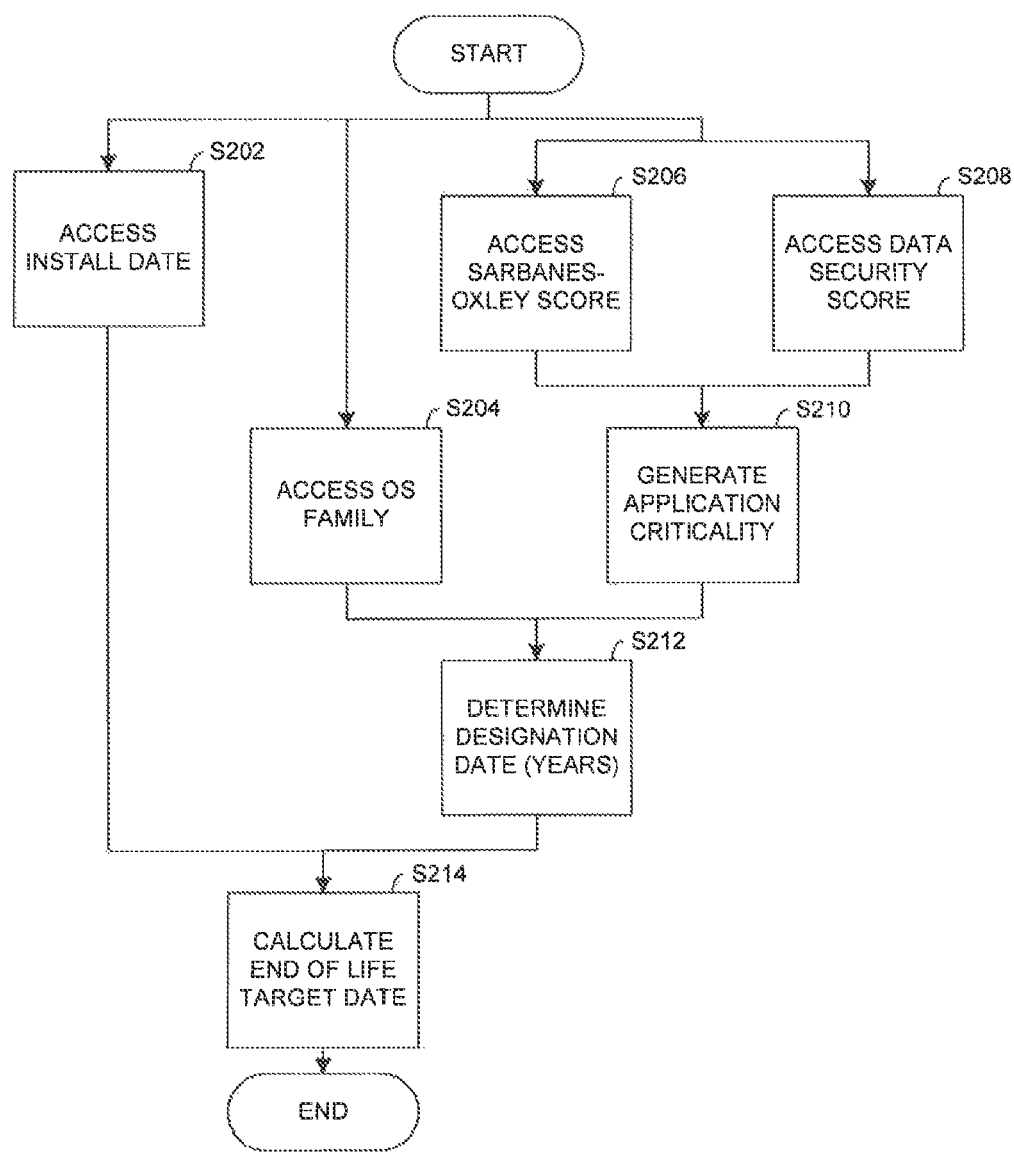
FIG. 2 is a flowchart illustrating one example process for calculating end of life of a server, according to various embodiments of the present disclosure.

FIG. 2 illustrates a flow chart of an example method 200 for calculating EOL target for a server, according to various embodiments of the present disclosure. As can be seen, the building of the EOL target used many factors in combination to arrive at its calculation. This is an additive process which used information provided and retrieved to calculate the End of Life target date. For example, in step S202, processing module 102 may access server installation dates for each server from server repository 104. In step S204, processing module 102 may access information about the operating systems running on each server. Processing module 102 may access the information from server repository 104. Processing module 102 determines the applications being processed by each server.

In step S206, processing module 102 accesses SOX scores designated to each of the applications being processed by each server of the plurality of servers. For instance, processing module 102 may accesses the SOX scores from application repository 106. The SOX score may be designated to the applications based on the applications' association with Sarbanes Oxley Act of 2002. In one example implementation, a SOX indicator may be applied to each of the applications. The SOX indicator indicates whether the application is active, inactive or not SOX critical. Based on SOX indicator of the application, the SOX score may be assigned to the application. In one example implementation, SOX score for application with 'active' SOX indicator may be in a range of about 80 to about 100, and SOX score for application with SOX indicators 'inactive' and 'not SOX critical', may be in a range between about 0 and about 20. The SOX scores as discussed above are for illustrative purposes, the actual values may vary based on the organizational needs.

In step S208, processing module 102 accesses a data security score attributed to an application processed by each server. For instance, processing module 102 may access the data security score from application repository 106. The application may be assigned with the data security score based on assigned scaled weight of security needed for the application running on the server. The applications may be classified into public, business confidential, restricted and secret based on the weight of the security needed. The applications classified as public may have a least security weight, while the applications classified as secret may have a maximum security weight. The application classified as public may be attributed with data security score in a range of about 0 to about 20, the application classified as business confidential may be attributed with data security score in a range of about in a range of about 20 to about 40. Similarly, the application classified as restricted may be attributed with data security score in a range of about 40 to about 80, and the application classified as business secret may be attributed with data security score in a range of about 80 to about 100 as the data security score. The attributed values as discussed above are for illustrative purposes, and the actual values may vary based on the organizational needs.

In step S210, processing module 102 generates an application criticality score for each of the applications based on the SOX score and the data security score of the corresponding applications. Processing module 102 may generate the application criticality score of an application by calculating a weighted sum of the SOX score and the data security score, where the weights may be set depending upon individual needs of the organization. The resulting application criticality score indicates the criticality of the application. In various embodiments, the application criticality score for any application less than or equal to predefined threshold value (for example, 50) indicates that the application is not critical. The application criticality score for any application greater than the threshold value indicates that the application criticality is high.

In step S212, processing module 102 determines a value for each of the plurality of applications running on the servers using a matrix, where the operating system platform of the application processed by each server is mapped with the application criticality of the application processed by the each server. The matrix provides values corresponding to the operating system platform based on the application criticality for the application running on corresponding operating system platform. The values may represent the number years after which the uplifting is due. An example matrix according to various embodiments is provided below.

TABLE 1

| Platform | Low | High |
| --- | --- | --- |
| Linux | 5 | 4 |
| Unix-AIX | 6 | 5 |
| Unix-Sun | 5 | 4 |
| Windows | 5 | 4 |
| Unknown/Other | 6 | 5 |

According to the examples provided in Table 1, the first row indicates that the designated year for uplifting of an application running on a Linux operating system platform, which has a low application criticality, is the fifth year from the date of installation. The designated year for uplifting is the fourth year for an application running on the Linux operating system platform, which has a high application criticality. The second row indicates that designated year for uplifting is the sixth year for an application running on Unix-AIX operating system platform, which has a low application criticality. The designated year for uplifting is the fifth year for an application running on the Unix-AIX operating system platform, which has a high application criticality. The third row indicates that designated year for uplifting is the fifth year for an application running on Unix-Sun operating system platform, which has a low application criticality. The designated year for uplifting is the fourth year for an application running on the Unix-Sun operating system platform, which has a high application criticality. Other values are apparent as illustrated in table. The values provided in the matrix are for illustrative purposes; the actual values may depend and vary on the organizational needs.

The matrix may be derived depending upon individual needs of the organization. According to various embodiments, the organization may derive the matrix based on an understanding of life cycle of operating systems in the market, advancement in internal and external technologies, need for migration, the ease of migration, the application criticality and/or the like. The matrix may indicate a value that represent the number years after which the uplifting is due. According to various embodiments, if the application criticality is high, the organization may set a lower value. If the application criticality is low, the organization may set a higher value.

In step S214, processing module 102 calculates the EOL target date of each of the servers using the calculated designated year for uplifting from the installation date of each the server. Consider an example: Server A may be installed on 1 Jan. 2010, having a Linux operating system supporting an active application. The SOX score for the active application (with SOX indicator 'active') may be set as, for example, 100. The application may be a proprietary application having trade secret algorithm for performing an operation in the organization. Accordingly, data security score for the application may be set as 100. Processing module 102 may generate the application criticality score by calculating the weighted sum of the SOX score and the data security score. In the current example, the SOX score and the data security score may be assigned 50% weight each. Thus, the application criticality score is 100 indicating that the application criticality is high. Processing module 102 may determine a value from, for example, the matrix of table 1, by comparing the operating system platform of the application with the application criticality. The value represent the number years from the date of installation after which the uplifting is due. In the current example, processing module 102 may determine that the EOL target date for server A is four (4) years from date of installation, that is, 1 Jan. 2014. Although, the values/scores shown above are discrete values, the values may be continuous values as well.

Figure 3:
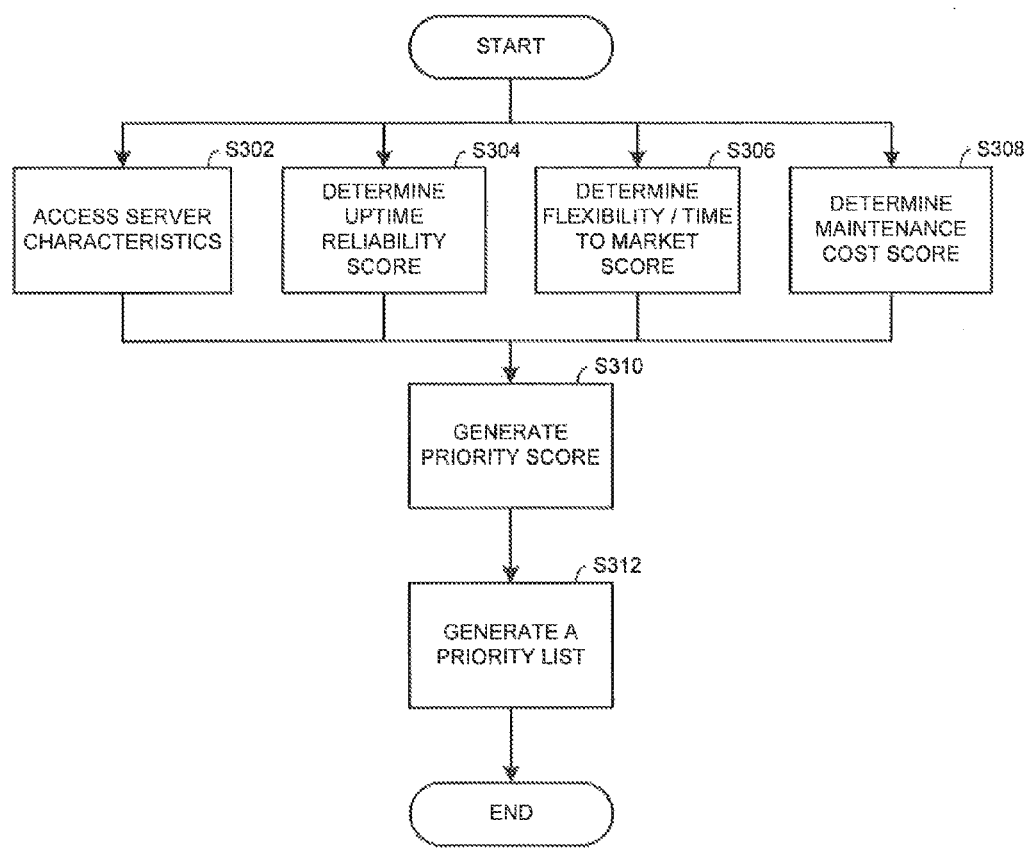
FIG. 3 is a flowchart illustrating an example process for prioritizing uplifts for each of the servers to create a priority, according to various embodiments of the present disclosure.

FIG. 3 depicts an example method 300 for prioritizing uplifts for each of the servers to create a priority according to various embodiments. Based on the weights of various characteristics in combination, a priority score may be calculated. The total, priority score, may be based on values set by the organization in combination. In step S302, processing module 102 accesses server characteristics of each server from server repository 104. The server characteristics may include virtual or physical server designations of the servers. The virtual server designations of the servers include virtual servers or VSS. The physical server designations of the servers include 'V parent' or 'physical' servers. In step S304, processing module 102 determines uptime reliability score for each of the servers by calculating a weighted sum of one or more of values representing age of the servers, server utilization, the application being processed by each server's criticality, the age of manufacturer's hardware model for each server, the hardware warranty status for each server, availability of operating system support for each servers, and the like. The weights may be set depending upon individual needs of the organization. The uptime reliability score may be a range of scores that indicate the reliability of an element. In one example implementation, the uptime reliability score of one (1) may indicate high reliability, five (5) may indicate low reliability, and zero (0) may indicate unusable data or omit factor due to lack of data. Although, the values are illustrated to be discrete values, the values can also be in continues values.

The value representing the age of the servers may be obtained based on relationship between server age and component failure. These values may be stored/maintained in a table or database. Statistically, it may be found that x86 based servers experience a component failure in an age 0-3 years, 50% chances of component failures in the age of 3-5 years and 100% chance of component failures in the age 5 years and above. Correspondingly, the value representing the age of servers may be assigned based on age of servers. According to various embodiments, one (1) may be assigned as the value that represents servers of age 0-3 years, three (3) for servers of age 3-5 years, and five (5) for servers of age 5+ years. Zero (0) may be assigned as the value for servers of unknown age. Processing module 102 may obtain the value representing the age of the servers from server repository 104.

The value representing the server utilization may be based on information on utilization of servers. According to various embodiments, one (1) may be assigned as an value representing the servers that are less utilized, five (5) for servers that are highly utilized, and zero (0) for servers of which the utilization is not known. Further, the value representing application being processed by server's criticality may be based on the server's criticality. One (1) may be assigned as an value for applications processed by servers that are not critical, five (5) for applications that are processed by servers that are highly critical, and zero (0) for applications that are processed by severs of which criticality is not known. Processing module 102 may obtain the value representing the server utilization and application being processed by server's criticality, from server repository 104.

The value representing the age of manufacturer's hardware model for each server may be based on end of service life (EOSL) data of the servers. According to various embodiments, one (1) may be assigned as a value for servers that are within useful service life, five (5) for servers that are after EOSL and zero (0) for servers having no manufacture defined EOSL. The value representing hardware warranty status for each server may be based on availability of the hardware warranty for each of the servers. One (1) may be assigned as a value for servers that are covered by warranty, five (5) for servers that are not covered by warranty and zero (0) for servers having no warranty information. The value representing the availability of operating system support for each server may be based on information from the operating system manufacturer. One (1) is assigned as a value for servers that have the operating system manufacturer support, five (5) for servers that have no operating system manufacturer support and zero (0) for servers having operating system with no information about operating system manufacturer support. The values discussed above are for illustrative purposes, and the actual values may depend and vary on the organizational needs. Processing module 102 may obtain the value representing the age of manufacturer's hardware model for each server, hardware warranty status and the availability of operating system support, from server repository 104.

In step S306, processing module 102 determines a flexibility score of each of the servers. The flexibility score may be based on age of the manufacturer's hardware model and alignment with current hardware standards of an organization running the applications on each server. Processing module 102 determines the flexibility score for each of the servers by calculating a weighted sum of values representing the age of the manufacturer's hardware model and alignment with current hardware standards of an organization running applications on each server for each of the servers. The weights may be set depending upon individual needs of the organization. According to various embodiments, a flexibility score of one (1) may indicate high flexibility, five (5) may indicate low flexibility, and zero (0) may indicate unknown flexibility. The value representing the age of the manufacturer's hardware model may indicate whether the server is within the EOSL. A value representing the age of the manufacturer's hardware model for servers that are within the EOSL may be set to one (1), and value representing the age of the manufacturer's hardware model for servers that are not within the EOSL may be set to five (5). The value representing the age of the manufacturer's hardware model for servers that have no information about EOSL may be set to zero (0). The value representing the alignment with current hardware standards of an organization running applications on each server may be based on flexibility of the manufacturer's hardware to align with the current hardware standards of the organization. Values in the range of one (1) to five (5) may be assigned to the servers based on flexibility of the manufacturer's hardware to align with the current hardware standards of the organization. A value of one (1) may assigned to the manufacturer's hardware that has a very high flexibility to be aligned with current hardware standards of an organization running applications on each server. A value of five (5) may be assigned to the manufacturer's hardware has least flexibility to be aligned with current hardware standards of an organization running applications on each server. Processing module 102 may obtain the value representing age of the manufacturer's hardware model and alignment with current hardware standards of an organization running the applications on each server, from server repository 104.

In step S308, processing module 102 determines a maintenance cost score of each of the servers. The maintenance cost score may indicate the maintenance cost of the server and/or applications running on the server. The maintenance cost score may be based on the alignment with current hardware standards of an organization running applications on each server, orphaned server details and/or power consumption. Processing module 102 may determine the maintenance cost scores by calculating weighted sum of values representing the alignment with current hardware standards of an organization running applications on each server, orphaned server details and/or power consumption for each of the servers. The weights may be set depending upon individual needs of the organization. According to various embodiments, a maintenance cost score of one (1) may indicate a low maintenance cost, five (5) may indicate a high maintenance cost, and zero (0) may indicate unknown maintenance cost or no value.

The value representing the alignment with current hardware standards of an organization running applications on each server may indicate the scale of expense involved in aligning the server hardware to the hardware standards of the organization. According to various embodiments, values in the range of one (1) to five (5) may be assigned to the servers based on cost involved in aligning the server hardware to the hardware standards of the organization. A value of one (1) may indicate that the cost of aligning the server hardware to the hardware standards of the organization is very low. A value of five (5) may indicate that the cost of aligning the server hardware to the hardware standards of the organization is very high. Other intermediate values indicate costs relative to values of one (1) and five (5). Processing module 102 may obtain the value representing the alignment with current hardware standards of an organization running applications on each server from server repository 104.

The values representing the orphaned server may be based on applications being decommissioned or moved to another server. According to various embodiments, the value of one (1) may be assigned to server for applications being continued, five (5) for the servers where applications are decommissioned or moved, and zero (0) for servers having no applications. The values representing power consumption of server may be based on power being consumed. The value of one (1) may be assigned to servers consuming low power, five (5) for the servers that consume high power, and zero (0) for servers having no data about power consumption. Processing module 102 may obtain the value representing the orphaned server from server repository 104.

In step S310, processing module 102 generates a priority score for each of the servers. The priority score may be based on the server characteristics, the uptime reliability score, the flexibility score and the maintenance cost scores of the servers. If the server is a virtual server, processing module 102 may assign a predetermined score as the priority score. If the server is physical, processing module 102 may determine the priority score based on weighted sum of the uptime reliability scores, the flexibility score and/or the maintenance cost score. The weights may be set depending upon individual needs of the organization. According to various embodiments, the weight assigned to uptime reliability score may be in the range of around 50-70%, the weight assigned to the flexibility score may be in the range of around 10-30%, and the weight assigned to the maintenance cost score may be in the range of around 10-30%. Again, the values provided herein are for illustrative purposes, the actual values may vary based on the organizational needs.

In step S312, based on the priority score, processing module 102 generates the priority for uplifts. According to various embodiments, the priority may be generated based on multiple threshold scores. Based on priority score falling between the threshold scores, processing module 102 may indicate that the server may have to be uplifted according to a year from the current year corresponding to the threshold score.

In instances where one or more servers are already marked for uplift in general organization infrastructure related programs, abrupt failures, and the like, processing module 102 may not consider those servers for priority. The organization infrastructure related programs may include server decommissioning, application rationalization, application decommissioning, and/or application infrastructure uplift for all applications on the server. In addition, a server may be marked for uplift based on history of faults. Based on severity of faults, servers may be marked for uplift or decommission.

An example for determining priority for four (4) servers: server A, server B, server C and server D is described herein. Priority for an uplift may be determined based on priority score. The priority score may be based on weighted sum of the uptime reliability scores, the flexibility score and the maintenance cost score.

The uptime reliability score may be a weighted sum of values representing two or more of age of server, server utilization, applications being processed by each server's criticality, age of manufacturer's hardware model for each server, hardware warranty status for each server and/or availability of operating system support for each server. In current example, date of installation is Jan. 1, 2010 for of server A, Jan. 1, 2007 for server B, Jan. 1, 2008 for server C, and Mar. 1, 2010 for server D. Assuming that the current year is 2012, in the current example, the age of server A is two (2) years, the age of server B is five (5) years, the age of server C is four (4) years, and the age of server D is two (2) years. Correspondingly, the value representing the age of server may be one (1) for server A, five (5) for server B, three (3) for server C and one (1) for server D. Further, servers A-D may be highly utilized. Accordingly, the value of five (5) may be assigned to the servers A-D.

According to various embodiments, application criticality may be 'high' for servers A and server B, and 'low' for server C and server D. Correspondingly, the value representing server A and server B is one (1). The value representing server C and server D is five (5). Further, the age of manufacturer's hardware model is 'before EOSL' for servers A and server D, and 'after EOSL' for server B and C. Correspondingly, the values representing the age of manufacturer's hardware model is one (1) for server A and server D, and five (5) for servers B and server C. Server A and server D may be in warranty, and server B and server C may be out of warranty. Thus, the values representing warranty status is one (1) for server A and server D, and five (5) for servers B and server C. The operating system of server A and D is Linux, the operating system of server B is Windows, and the operating system of server C is AIX. Further, server A and server C have manufacturer's support for respective operating systems, whereas server B and server D may not have manufacturer's support. Thus, the values representing manufacturer's support is one (1) for server A and server C, and five (5) for servers B and server D. Using the values representing the two or more of age of server, the server utilization, the applications being processed by each server's criticality, the age of manufacturer's hardware model for each server, the hardware warranty status for each server and the availability of operating system support for each server, the uptime reliability score may be calculated as 1.8, 4.2, 3.8 and 2.6, for server A, server B, server C, and server D, respectively. In the current example, the weight may be 20% for the values representing the two or more of age of server, the applications being processed by each server's criticality, the age of manufacturer's hardware model for each server, and the hardware warranty status for each server and the availability of operating system support for each server. The weight may be 0% for the values representing the server utilization.

The flexibility score may be calculated based on age of the manufacturer's hardware model and alignment with current hardware standards of an organization running applications on each server. The flexibility score may be weighted sum of values representing the age of the manufacturer's hardware model and the alignment with current hardware standards of an organization running applications on each server. As described herein, the values representing the age of manufacturer's hardware model is one (1) for server A and server D, and five (5) for servers B and server C. The server hardware of server A and server D may be highly flexible to be aligned with the current hardware standards of the organization. The server hardware of server B and server C may have low flexibility to be aligned with the current hardware standards of the organization. Correspondingly, the values representing the alignment with current hardware standards of an organization running applications on each server is one (1) for server A and server D, and five (5) for servers B and server C. In the current example, the weights may be 50% each for the values representing the age of the manufacturer's hardware model and the alignment with current hardware standards of an organization running applications on each server. Using the values above, the flexibility score may be 1 for server A and server D. The flexibility score may be 5 for server B and server C.

The maintenance cost score may be a weighted sum of values representing the alignment with current hardware standards of an organization running applications on each server, orphaned server details and/or power consumption. As described above, the values representing the alignment with current hardware standards of an organization running applications on each server is one (1) for server A and server D, and five (5) for servers B and server C. Further, servers A-D may have applications. Thus, the values representing orphaned server is one (1) for servers A-D. Server A and server D may consume power less than a threshold value. Server B and server C may consume power higher than a threshold value. Correspondingly, the values representing power consumption is one (1) for servers A-D, and five (5) for servers B-C. In the current example, the weight may be 25% each for the values representing the alignment with current hardware standards of an organization running applications on each server, orphaned server details, and 50% for values representing power consumption. Using the values above, the maintenance cost score may be one (1) for server A and server D. The maintenance cost score may be three (3) for server B and server C.

Priority score may be calculated based on server characteristics, the uptime reliability score, the flexibility score and the maintenance cost score. If a server has virtual characteristics, the server may be assigned with a predetermined priority score. In the current example, server C may be a virtual server, thus the priority score may be 1. Other servers are physical servers. The priority score for physical server may be calculated based on weighted sum of the uptime reliability score, the flexibility score and the maintenance cost score. In the current example, the weight assigned to uptime reliability score is 50%, the weight assigned to the flexibility score is 25%, and the weight assigned to the maintenance cost score is 25%. Thus, priority scores may be 1.4, 4.3 and 1.8 for servers A-B, server C and server D, respectively. In the example embodiment, if the priority score generated for a server is less than 5 and greater than 4, the server may be uplifted within the current year. Similarly, if the priority score generated for a server is in between 4 and 3, the server may be uplifted in the next year. If the priority score generated for a server is in between 3 and 2, the server may be uplifted in the 2nd year from the current year. If the priority score generated for a server is in between 2 and 1, the server may be uplifted in the 3rd year from the current year. If the priority score generated for a server is less than and/or equal to 1, the server may be uplifted in the 4th year from the current year. Assuming the current year to be 2012, server A is listed for uplifting after Jan. 1, 2014, server B is listed for uplifting in the current year (2012), server C may is listed for uplifting Jan. 1, 2014 and server D may be uplifted after Jan. 1, 2014. Again, the values and weights are provided for illustrative purposes, the actual values and weights may vary based on the organizational needs.

Figure 4:
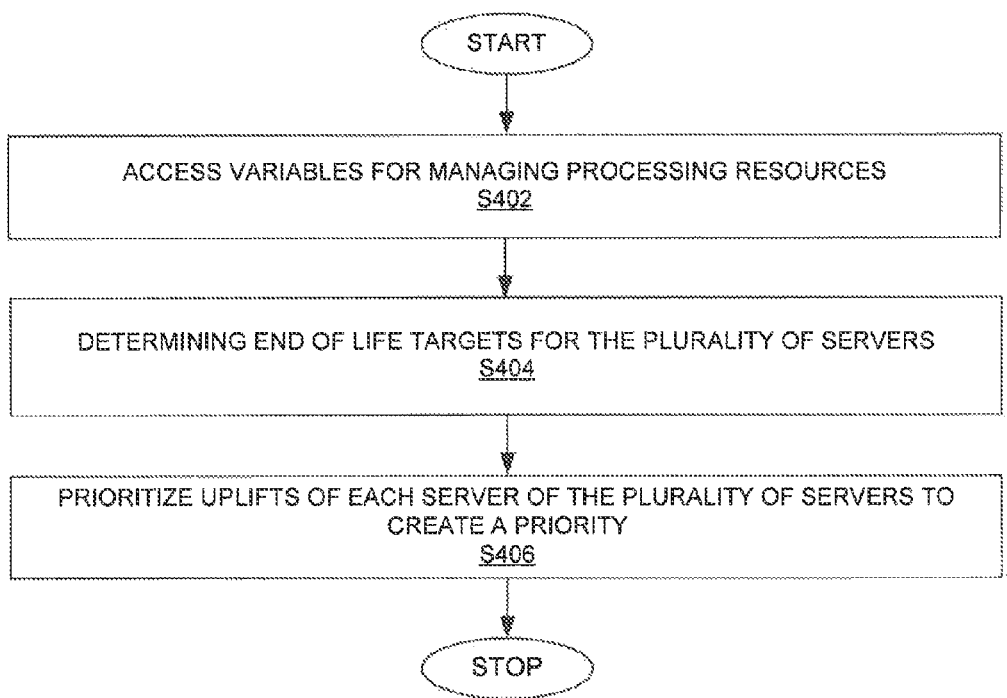
FIG. 4 is a process flow illustrating an example process for managing processing resources, according to various embodiments of the present disclosure.
Figure 5:
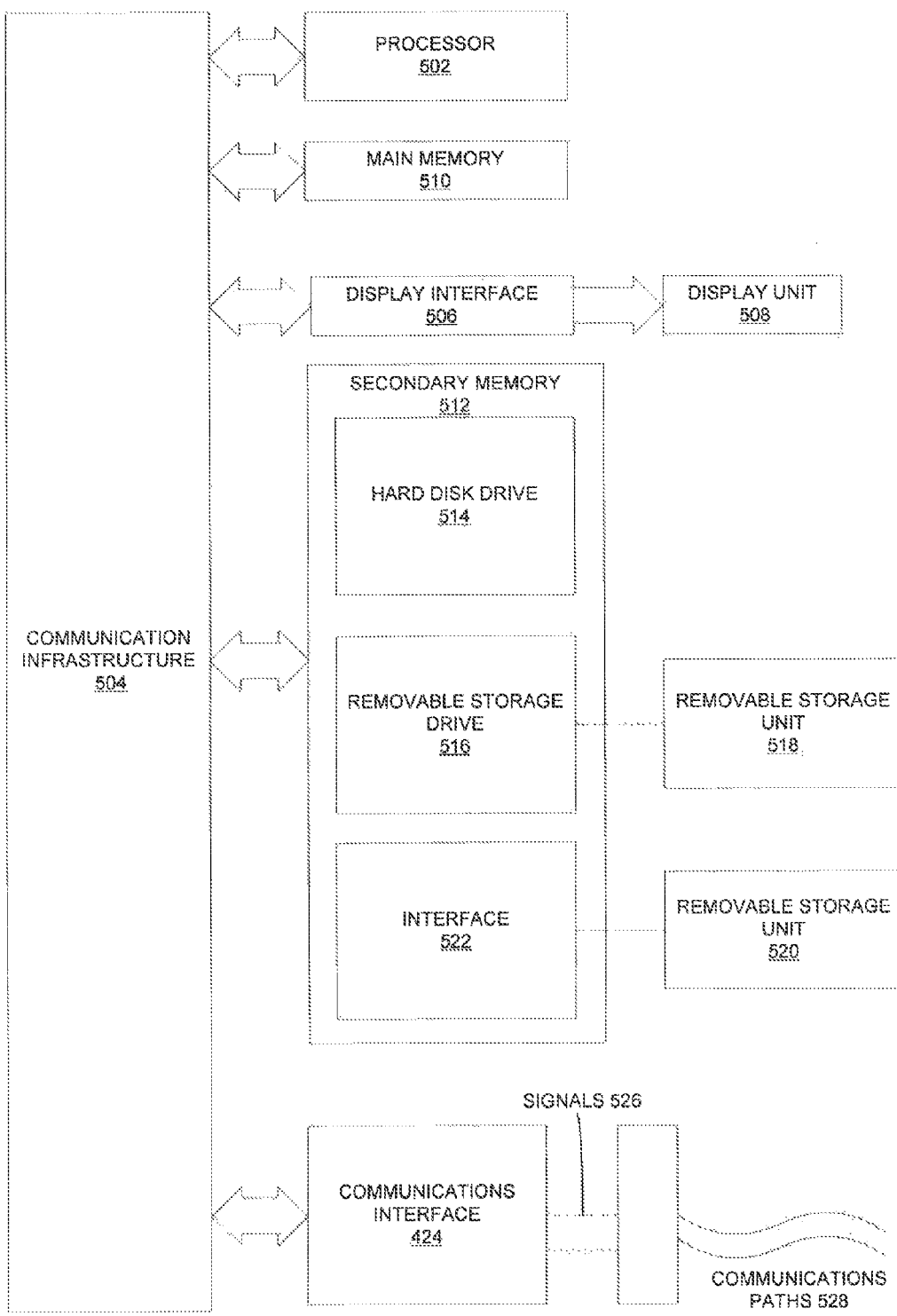
FIG. 5 is a block diagram of an exemplary computer system, according to various embodiments of the present disclosure.

FIG. 4 is a flowchart illustrating an example process 400 for management of the processing resources, according to various embodiments of the present disclosure. In step S402, processing module 102 accesses variables for managing processing resource. According to various embodiments, processing module 102 may access variables from server repository 104 and application repository. The variables may facilitate compiling a prioritized list of servers of the plurality of servers. In step S404, processing module 102 determines the EOL targets for the plurality of servers. Processing module 102 may determine the EOL targets based on first set of technical and business parameters. Processing module 102 may determine the EOL targets based on the first set of technical and business parameters. The first set of technical and business parameters include the installation date of servers, information associated with operating system implemented on each of the servers, an application criticality score based on a combination of a Sarbanes Oxley score and/or a data security score of an application processed by each server. In step S406, processing module 103 prioritizes uplifts of each server of the plurality of servers. Processing module 102 may prioritizes uplifts based on the second set of technical and business parameters. The second set of technical and business parameters may include server characteristics, uptime reliability score, flexibility, and/or a maintenance cost score.

The present disclosure (i.e., processing module 102, process 200, process 300, process 400, or any part(s) or function(s) thereof) may be implemented using hardware, software or a combination thereof, and may be implemented in one or more computer systems or other processing systems. However, the manipulations performed by the system were often referred to in terms, such as comparing or checking, which are commonly associated with mental operations performed by a human operator. No such capability of a human operator is necessary, or desirable in most cases, in any of the operations described herein, which form a part of the disclosure. Rather, the operations are machine operations. Useful machines for performing the operations in the system may include general-purpose digital computers or similar devices.

Computer system 500 includes at least one processor, such as a processor 502. Processor 502 is connected to a communication infrastructure 504, for example, a communications bus, a cross over bar, a network, and the like. Various software embodiments are described in terms of this exemplary computer system 500. After reading this description, it will become apparent to a person skilled in the relevant art(s) how to implement the disclosure using other computer systems and/or architectures.

Computer system 500 includes a display interface 506 that forwards graphics, text, and other data from the communication infrastructure 504 for display on a display unit 508.

Computer system 500 further includes a main memory 510, such as random access memory (RAM), and may also include a secondary memory 512. Secondary memory 512 may further include, for example, a hard disk drive 514 and/or a removable storage drive 516, representing a floppy disk drive, a magnetic tape drive, an optical disk drive, etc. Removable storage drive 516 reads from and/or writes to a removable storage unit 518 in a well known manner. Removable storage unit 518 may represent a floppy disk, magnetic tape or an optical disk, and may be read by and written to by removable storage drive 516. As will be appreciated, removable storage unit 518 includes a computer usable storage medium having stored therein, computer software and/or data.

In accordance with various embodiments, secondary memory 512 may include other similar devices for allowing computer programs or other instructions to be loaded into computer system 500. Such devices may include, for example, a removable storage unit 520, and an interface 522. Examples of such may include a program cartridge and cartridge interface (such as that found in video game devices), a removable memory chip (such as an erasable programmable read only memory (EPROM), or programmable read only memory (PROM)) and associated socket, and other removable storage unit 520 and interfaces 522, which allow software and data to be transferred from removable storage unit 520 to computer system 500.

Computer system 500 may further include a communication interface 524. Communication interface 524 allows software and data to be transferred between the computer system 500 and external devices. Examples of communication interface 524 include, but may not be limited to a modem, a network interface (such as an Ethernet card), a communications port, a Personal Computer Memory Card International Association (PCMCIA) slot and card, and the like. Software and data transferred via the communication interface 524 are in the form of a plurality of signals, hereinafter referred to as signals 526, which may be electronic, electromagnetic, optical or other signals capable of being received by the communication interface 524. Signals 526 are provided to communication interface 524 via a communication path (e.g., channel) 528. Communication path 528 carries signals 526 and may be implemented using wire or cable, fiber optics, a telephone line, a cellular link, a radio frequency (RF) link and other communication channels.

In this document, the terms "computer program medium" and "computer usable medium" are used to generally refer to media such as removable storage drive 516, a hard disk installed in hard disk drive 514, signals 526, and the like. These computer program products provide software to computer system 500. The present disclosure is directed to such computer program products.

Computer programs (also referred to as computer control logic) are stored in main memory 510 and/or secondary memory 512. Computer programs may also be received via the communication infrastructure 504. Such computer programs, when executed, enable computer system 500 to perform the features of the present disclosure, as discussed herein. In particular, the computer programs, when executed, enable processor 502 to perform the features of the present disclosure. Accordingly, such computer programs represent controllers of computer system 500.

In accordance with various embodiments, software may be stored in a computer program product and loaded into computer system 500 using the removable storage drive 516, hard disk drive 514 or communication interface 524. The control logic (software), when executed by processor 502, causes processor 502 to perform the functions of the present disclosure as described herein.

In various embodiments, the present disclosure is implemented primarily in hardware using, for example, hardware components such as application specific integrated circuits (ASIC). Implementation of the hardware state machine so as to perform the functions described herein will be apparent to persons skilled in the relevant art(s).

According to various embodiments, the aspects of the present disclosure are implemented using a combination of both the hardware and the software. As used herein, the term "server" as described herein may include server hardware, server software, applications and/or services hosted by the server, and/or combinations thereof. The organization may also use one or more database systems communicatively coupled to the one or more servers for storing various data, such as, organizational data, merchant data, customer data and/or the like.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

The computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999);

DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or various embodiments combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 1-4 the process flows and screenshots depicted are merely embodiments and are not intended to limit the scope of the disclosure. For example, the steps recited in any of the method or process descriptions may be executed in any order and are not limited to the order presented.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

In addition, it should be understood that the figures illustrated in the attachments, which highlight the functionality and advantages of the present disclosure, are presented for example purposes only. The architecture of the present disclosure is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

The invention claimed is:

1. A method comprising:
   scoring, by a computer-based system, an application running on a server to create a data security score based on assessing data security of the application compared to a standard;
   determining, by the computer-based system and using the application, an end of life target for the server based on a first set of parameters for the application running on the server,
      wherein the first set of parameters comprise an application criticality score based on a combination of a Sarbanes Oxley score and the data security score of the application processed by the server,
   updating, by the computer-based system, the application criticality score based on a weighted Sarbanes Oxley score and a weighted data security score, wherein the weight is based on an importance of a security of the application;
   comparing, by the computer-based system, an operating system platform of the application processed by the server with the application criticality score of the application processed by the server;
   determining, by the computer-based system and based on the comparison, an end of life target for the server;
   prioritizing, by the computer-based system, uplifts of the server, along with a plurality of servers to create a prioritized list of servers, wherein the prioritizing is based on a second set of parameters; and
   removing, by the computer-based system, the server from the prioritized list of servers based on an indicator signifying the server is previously designated to be uplifted.

2. The method of claim 1, further comprising uplifting, by the computer-based system, the server of the plurality of servers based on the prioritizing, wherein the uplifting includes at least one of replacement, refresh, modification, upgrade or update to at least one of hardware or software of the server.

3. The method of claim 1, further comprising:
   obtaining, by the computer-based system, the weight for the Sarbanes Oxley score to create the weighted Sarbanes Oxley score;
   obtaining, by the computer-based system, the weight for the data security score to create the weighted data security score;
   adjusting, by the computer-based system, the application criticality score based on an importance of the application for an organization, a customer or a merchant;
   determining, by the computer-based system, an application criticality based on the application criticality score being above a pre-determined threshold;
   comparing, by the computer-based system, an operating system platform of the application processed by the server with the application criticality of the application processed by the server;
   adjusting, by the computer-based system and based on the comparison, the end of life target for the server; and
   determining, by the computer-based system, a designated year to replace the server, based on the end of life target.

4. The method of claim 1, further comprising compiling the prioritized list of servers of the plurality of servers based on variables and wherein the variables include a server install date, the operating system of an application being processed by each server of the plurality of servers, a Sarbanes-Oxley score designated to an application processed by each server of the plurality of servers, and a data security score attributed to an application processed by each server.

5. The method of claim 1, further comprising assessing, by the computer-based system and based on a standard, data security of an application processed by each server of the plurality of servers to create the data security score, wherein the data security score includes a public, business confidential, restricted or secret designation of the application processed by each server of the plurality of servers, wherein the data security score is based on an assigned scaled weight of security needed for each application running on each server of the plurality of servers.

6. The method of claim 1, wherein the Sarbanes Oxley score is based on a Sarbanes Oxley code designated to the application processed by the server based on the application's association with the Sarbanes Oxley Act of 2002, wherein the Sarbanes Oxley code indicates whether the application is at least one of active critical application, inactive or not Sarbanes Oxley Act of 2002 critical.

7. The method of claim 1, wherein the server's end of life target is based on a matrix where the operating system platform of the application processed by the server is compared with an application criticality of the application processed by the server.

8. The method of claim 1, wherein the server's end of life target comprises a designated year for uplifting as calculated from the installation date of the server.

9. The method of claim 1, wherein the first set of parameters of the application is based on the variables.

10. The method of claim 1, wherein the second set of parameters comprise server characteristics, uptime reliability score, flexibility, and a maintenance cost score.

11. The method of claim 1, wherein the server characteristics comprise a virtual or physical server designation.

12. The method of claim 1, wherein the uptime reliability score is based on at least one of the age of the server, server utilization, the application being processed by the server's criticality, age of manufacturer' hardware model for the server, hardware warranty status for the server, or availability of operating system support for the server.

13. The method of claim 1, wherein the second set of parameters comprise flexibility, and wherein the flexibility is based on at least one of the age of the manufacturers hardware model or an alignment with current hardware standards of an organization running applications on the server.

14. The method of claim 1, wherein the second set of parameters comprise a maintenance cost score, and wherein the maintenance cost score is based on at least one of alignment with current hardware standards of an organization running applications on the server, designation of orphaned servers, or power consumption of the server.

15. The method of claim 1, further comprising updating the prioritizing the servers based on the start of a new budget term.

16. The method of claim 1, further comprising specifying the server with a history of faults ahead of older servers on an individual basis.

17. The method of claim 1, further comprising removing, by the computer-based system, the server from the prioritized list of servers based on the indicator further signifying the server is previously designated to be uplifted out of turn and that a business unit is planning on paying for the uplift.

18. The method of claim 1, wherein the indicator is retrieved from at least one of a server repository or an application repository.

19. A system comprising:
a processor,
a tangible, non-transitory memory configured to communicate with the processor, the tangible, non-transitory memory having instructions stored thereon that, in response to execution by the processor, cause the processor to perform operations comprising:
scoring, by the processor, an application running on a server to create a data security score based on assessing data security of the application compared to a standard;
determining, by the processor and using the application, an end of life target for the server based on a first set of parameters for the application running on the server,
wherein the first set of parameters comprise an application criticality score based on a combination of a Sarbanes Oxley score and the data security score of the application processed by the server,
updating, by the processor, the application criticality score based on a weighted Sarbanes Oxley score and a weighted data security score, wherein the weight is based on an importance of a security of the application;
comparing, by the processor, an operating system platform of the application processed by the server with the application criticality score of the application processed by the server;
determining, by the processor and based on the comparison, an end of life target for the server;
prioritizing, by the processor, uplifts of the server, along with a plurality of servers to create a prioritized list of servers, wherein the prioritizing is based on a second set of parameters; and
removing, by the processor, the server from the prioritized list of servers based on an indicator signifying the server is previously designated to be uplifted.

20. An article of manufacture including a non-transitory, tangible computer readable storage medium having instructions stored thereon that, in response to execution by a computer-based system, cause the computer-based system to perform operations comprising:
scoring, by the computer-based system, an application running on a server to create a data security score based on assessing data security of the application compared to a standard;
determining, by the computer-based system and using the application, an end of life target for the server based on a first set of parameters for the application running on the server,
wherein the first set of parameters comprise an application criticality score based on a combination of a Sarbanes Oxley score and the data security score of the application processed by the server,
updating, by the computer-based system, the application criticality score based on a weighted Sarbanes Oxley score and a weighted data security score, wherein the weight is based on an importance of a security of the application;
comparing, by the computer-based system, an operating system platform of the application processed by the server with the application criticality score of the application processed by the server;
determining, by the computer-based system and based on the comparison, an end of life target for the server;
prioritizing, by the computer-based system, uplifts of the server, along with a plurality of servers to create a prioritized list of servers , wherein the prioritizing is based on a second set of parameters; and
removing, by the computer-based system, the server from the prioritized list of servers based on an indicator signifying the server is previously designated to be uplifted.

* * * * *